Nov. 21, 1933.  A. A. THOMAS  1,936,043
CINEMATOGRAPHIC AND ACOUSTIC APPARATUS
Filed July 20, 1929   5 Sheets-Sheet 1
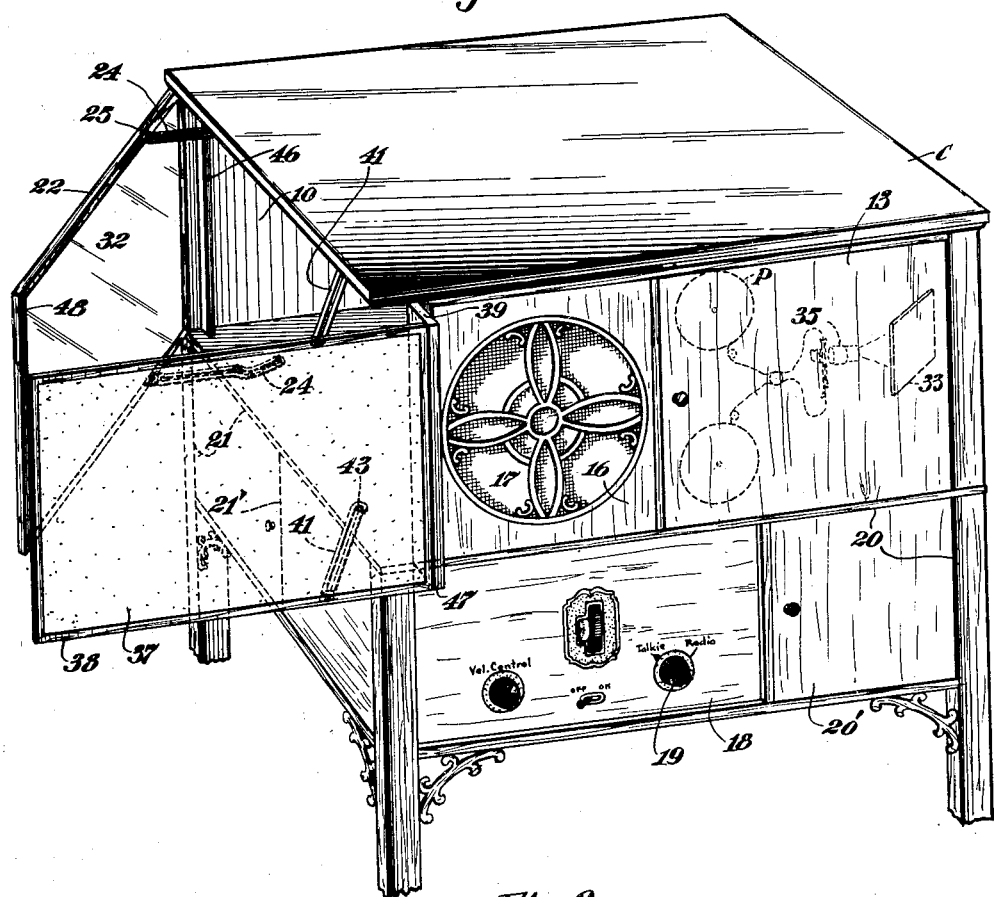
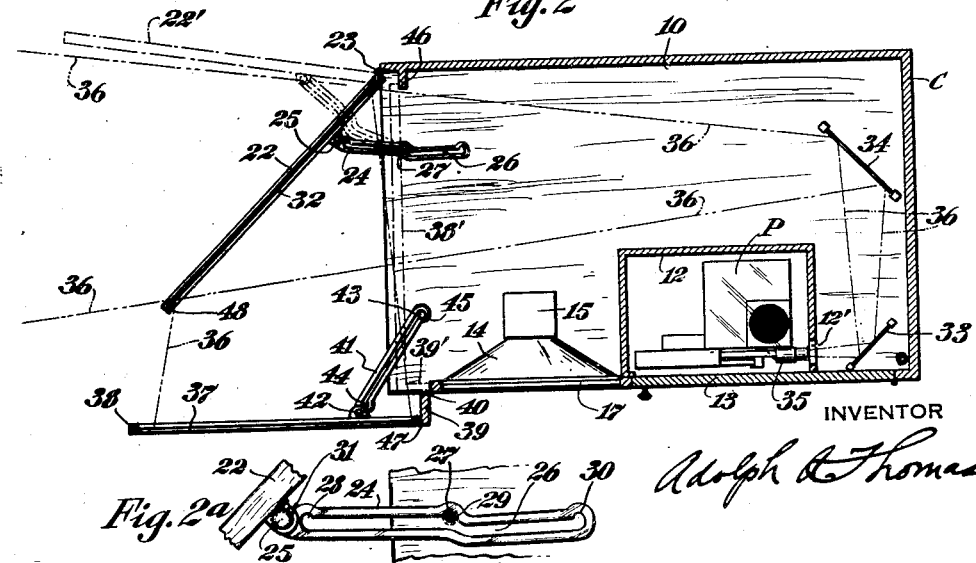
INVENTOR
Adolph A. Thomas

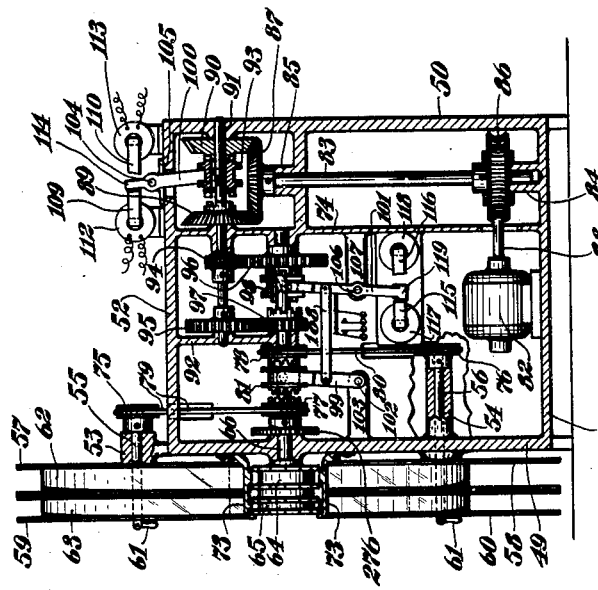
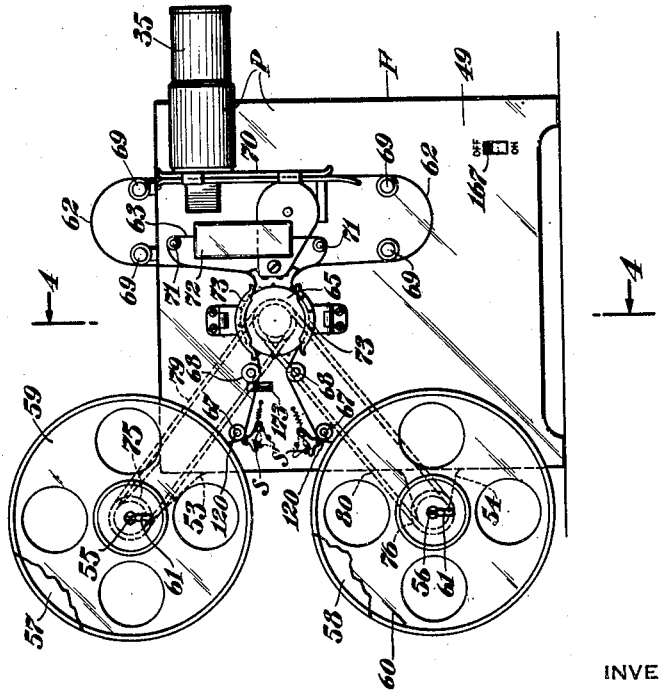

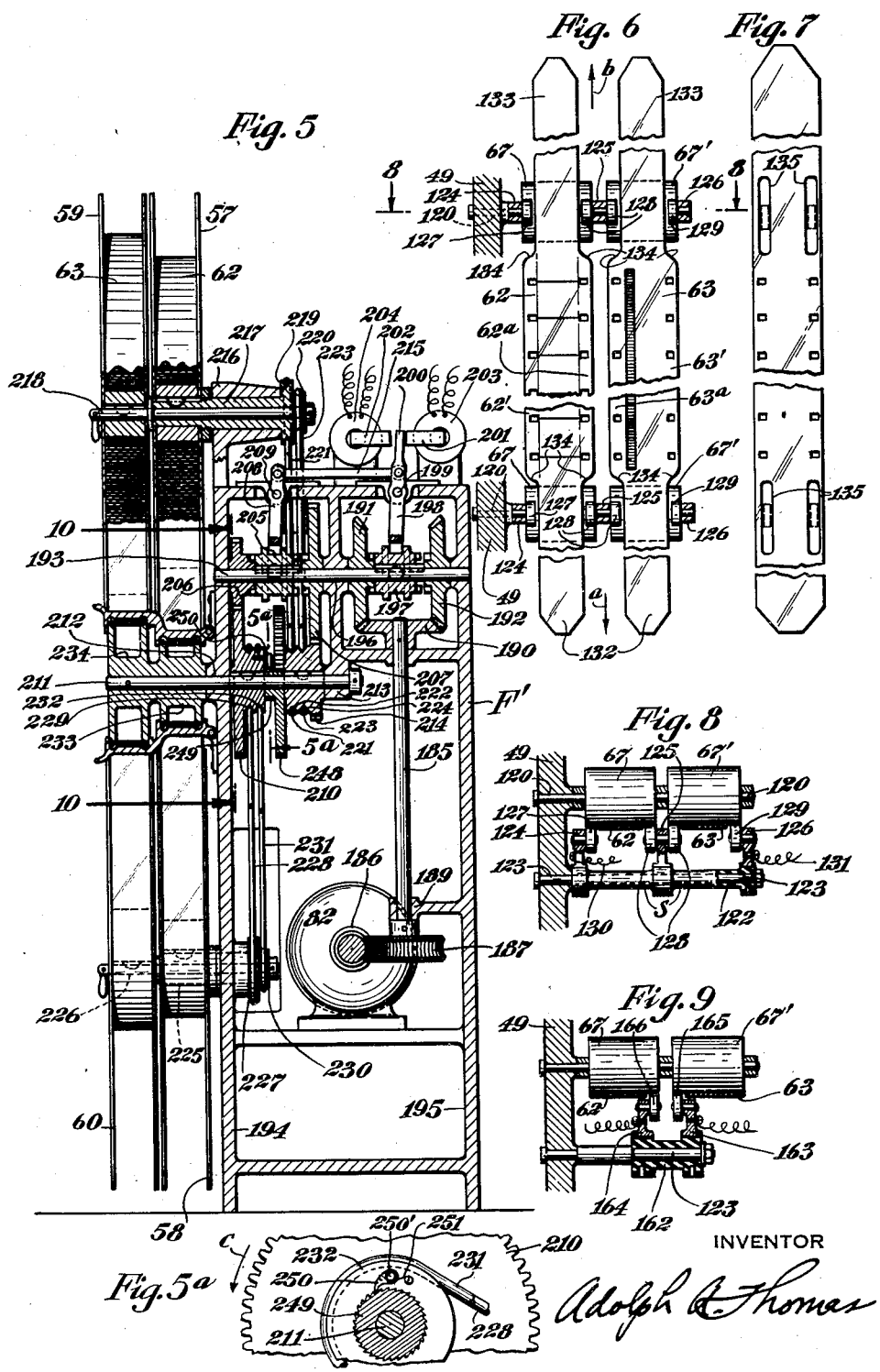

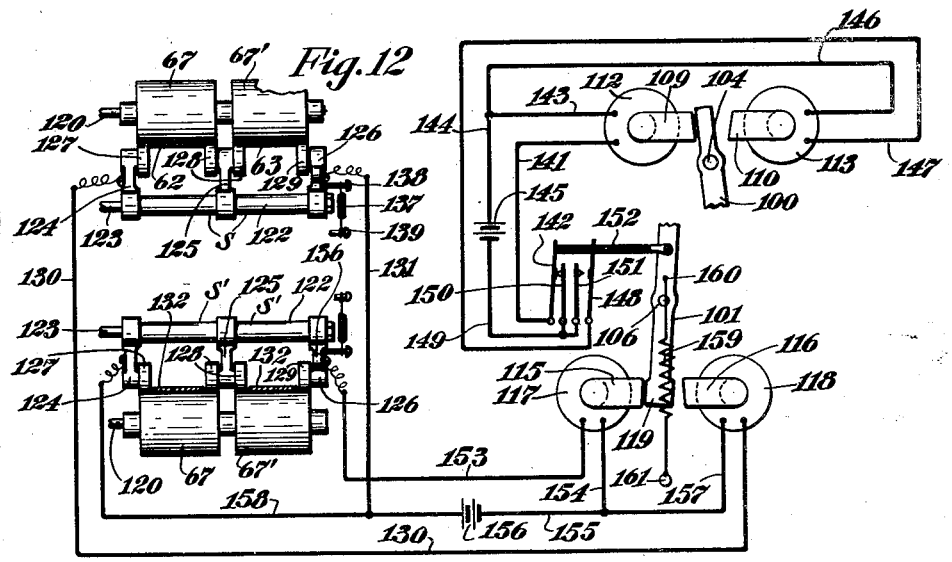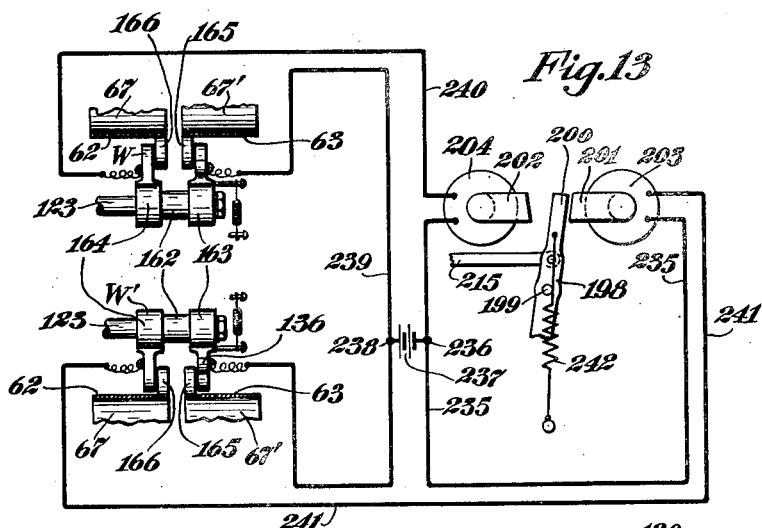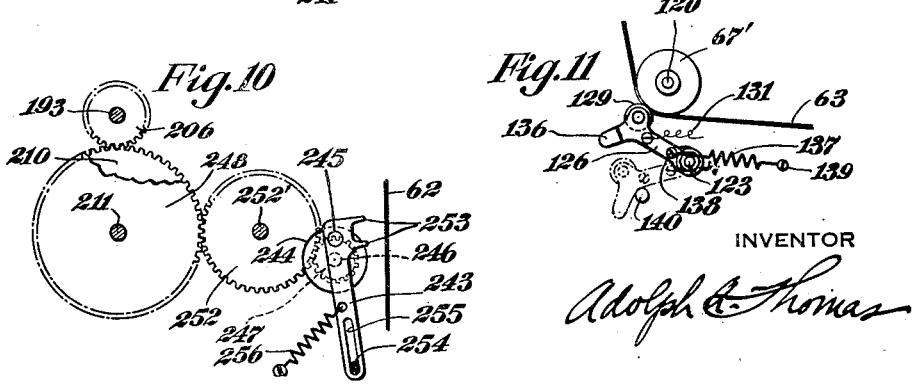

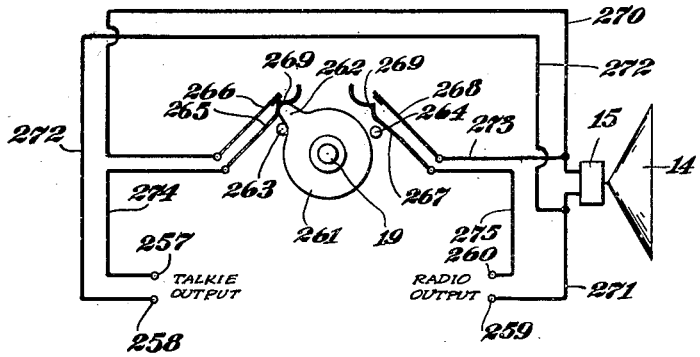
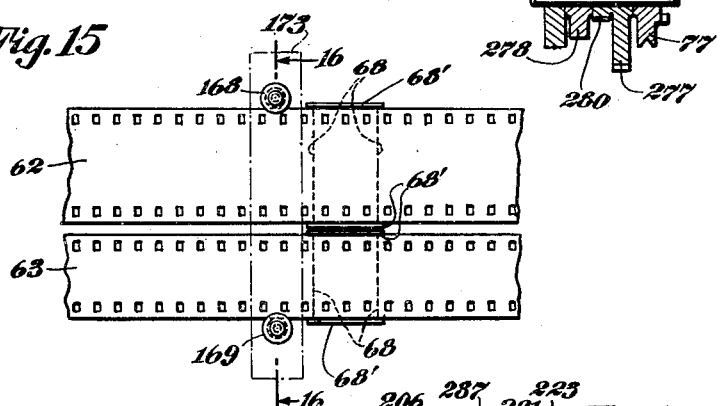
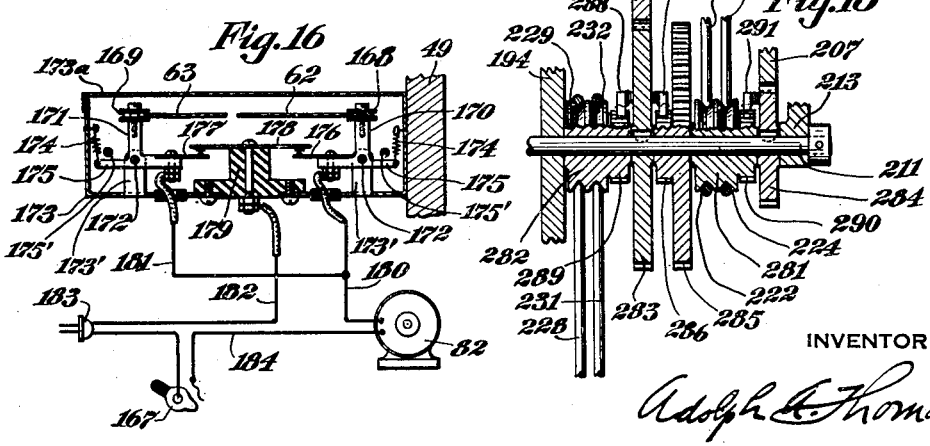

Patented Nov. 21, 1933                                                     1,936,043

UNITED STATES PATENT OFFICE 1,936,043

CINEMATOGRAPHIC AND ACOUSTIC APPARATUS

Adolph A. Thomas, New York, N. Y.

Application July 20, 1929. Serial No. 379,668

25 Claims. (Cl. 242—55)

My invention is for a self-contained cabinet of novel construction adapted to operate as a talking or silent movie projector, as a phonographic sound reproducer, and preferably also as a radio receiver. The purpose of this invention is to provide a single piece of household furniture capable of giving musical and educational home entertainment in a variety of ways.

One feature of my invention comprises a cabinet having a motion picture screen of adequate size, which is normally invisible but is readily adjusted into operative relation to a projector mounted in the cabinet. In a preferred form of my new apparatus, the screen is hinged at one end of the cabinet and may be swung forward to project beyond the cabinet substantially parallel with the front panel. A system of mirrors interposed between the projector and the screen provides a light path of such length that the picture practically fills the screen. One of the mirrors is carried by a hinged panel which normally covers the screen and forms an outer wall of the cabinet structure. This movable mirror may be swung back out of the light path to permit projection on a larger screen placed at the proper distance from the cabinet.

Another feature of my invention is a talking movie projector mounted in the cabinet so as to be easily accessible. The mechanism of this projector contains several novel points which I shall later describe in detail. For the present I need only mention that the projector has two pairs of reels for carrying a picture film and its accompanying sound film side-by-side. The sound reels may be driven independently of the picture reels and at a different rate of speed if necessary. When the end of the films is reached, the driving shaft is automatically reversed to rewind the films at greatly increased speed. The reels are automatically stopped when the films are rewound, as by opening the circuit of the electric motor that operates the driving shaft. The projector may be operated without a sound film to project silent pictures, and without a picture film to reproduce sound like a phonograph. A loudspeaker mounted in the cabinet is controlled by the sound film.

My new cabinet may also contain a radio receiver. A suitable finger piece, such as a rotary knob, connects the loudspeaker either with the radio mechanism or the sound film. A switch member conveniently located on the front panel of the cabinet connects the radio set and the driving motor of the projector into and out of circuit. A compartment in the cabinet provides ample storage space for reels of films.

The foregoing and other novel features and practical advantages of my invention will be understood from a description of the accompanying drawings, in which—

Fig. 1 illustrates a self-contained combination radio-talking-movie cabinet constructed in accordance with my invention, the screen being shown in operative position;

Fig. 2 is a sectional plan view of the cabinet;

Fig. 2a shows an enlargement of a mirror stop used in the cabinet;

Fig. 3 is a side view of the talking picture projector;

Fig. 4 represents a cross-section on line 4—4 of Fig. 3;

Fig. 5 shows a modified form of projector in transverse cross-section;

Fig. 5a is a section on line 5a—5a of Fig. 5, showing a ratchet and pawl connection for driving the intermittent movement;

Fig. 6 is a detached face view of a picture film and its accompanying sound film, together with certain switch devices controlled by the films;

Fig. 7 shows a modified form of switch-operating film;

Fig. 8 is a section on line 8—8 of Fig. 6;

Fig. 9 shows a modified form of switch device controlled by the films;

Fig. 10 illustrates, in a detailed side view, a novel intermittent movement for the projector to permit rewinding of the films at increased speed while the intermittent member is held away from the film;

Fig. 11 shows a detached side view of the switch device shown in Figs. 8 and 9;

Fig. 12 is a diagram of circuit connections in the projector of Figs. 3 and 4;

Fig. 13 is a diagram of circuit connections for operating certain electromagnetic clutches in Fig. 5;

Fig. 14 shows a simplified circuit diagram for the radio-talkie switch on the front panel of the cabinet;

Fig. 15 is a plan view of switch connections for automatically stopping the motor when the films are rewound;

Fig. 16 represents a section on line 16—16 of Fig. 15;

Fig. 17 is a detail, partly in section, showing a pawl and ratchet drive adapted to be inserted in Fig. 4 to disconnect the intermittent movement during the rewinding of the films; and Fig. 18 shows a modified driving mechanism for the sprocket shaft in Fig. 5.

Referring to Figs. 1 and 2, there is a cabinet C of suitable design provided with a horizontal projection chamber 10 which contains a talking movie projector indicated as a whole by P. If desired, the projector P may be enclosed in a fireproof case or housing 12. A hinged door 13 permits ready access to the projector for inserting and removing the films. The chamber 10 also contains a suitable loudspeaker, which in the present instance is represented by a cone diaphragm 14 actuated by a driving unit 15. Since there are various makes and types of loudspeakers in the market (usually distinguished as electromagnetic, dynamic and electrostatic), it is not necessary to go into the details of this mechanism. The diaphragm 14 is directly open to the outer air through an aperture in the front panel 16, which may carry an ornamental screen 17. The rear of loudspeaker 14 may be closed off to the outer air, or it may be open to chamber 10, which acts as a sound amplifier. Below the loudspeaker 14 is a radio receiver 18 of any approved make or design. A rotary knob 19 on the front panel of the receiver permits the loudspeaker 14 to be connected either to the radio set or to the sound unit of the talking movie projector P, as will later be explained. If the radio receiver 18 does not occupy the entire width and depth of the cabinet, there is a front compartment 20 and a side compartment 21 which may be used for storing films or other paraphernalia. These compartments are normally closed by hinged doors or sliding panels 20' and 21'.

The projection chamber 10, which extends the entire width of the cabinet, is normally closed at one end by an outer panel 22 hinged at 23 along its rear edge, so that it may be swung out to predetermined position. A pair of slotted bars or links 24 are hinged to the top and bottom of panel 22 on pins 25. A slot 26 in each link 24 engages a pin 27 fixed to the top and bottom walls of chamber 10, and these slots are preferably formed with lateral offsets which provide three locking notches 28, 29 and 30, as clearly shown in Fig. 2a. A coil spring 31 mounted on the pivot pin 25 of each locking bar 24 normally forces the rear edge of slot 26 against the fixed stop 27. When the hinged panel 22 is in normal or closed position, the stop 27 rests in notch 28. When the panel is moved into projecting position, as shown in Figs. 1 and 2, the intermediate notch 29 of link 24 engages the fixed stop 27. It is also possible to swing panel 22 into the extreme rear position indicated by dotted lines 22a in Fig. 2, and in that case the pin 27 engages notch 30. The shape of the notches in links 24 is such that the pin 27 locks the panel firmly in adjusted position and yet permits swinging of the panel to any other position by the application of a little pressure.

The inner face of panel 22 carries a mirror 32 which receives the light from projector P by reflection from a pair of fixed mirrors 33 and 34 at the right end of chamber 10. The mirror 33 is directly in line with the optical system 35 of projector P, there being an opening 12' in housing 12 for the passage of the light rays. The dash-dot lines 36 indicate diagrammatically the path of light issuing from the projector and reflected by the mirrors 33, 34 and 32. The angular position of mirror 32 is such that it throws the light on a motion picture screen 37 mounted in a frame 38, which is attached to a narrow vertical panel 39 hinged to the cabinet at 40. The screen frame 38 is firmly held in operative position by any practical means, such as one or two slotted links 41 pivoted to the frame at 42 and adapted to engage a fixed stop 43 in chamber 10. The longitudinal slot in each link 41 terminates in lateral recesses or notches 44 and 45, which are snapped by a coil spring on pivot pin 42 into releasable locking engagement with stop 43, as explained in connection with the holding links 24 of panel 22. When the screen frame 38 is swung fully out, the pin or stop 43 engages the rear notch 45 of link 41, whereby the screen 37 is firmly held in correct projecting position relative to mirror 32. When the frame 38 is swung back to normal position in the cabinet, the front notch 44 of link 41 snaps into engagement with stop 43 and the rear edge of the frame rests against a vertical strip 46 attached to the rear wall of the cabinet.

The dotted outlines 38' and 39' in Fig. 2 indicate the normal position of screen frame 38 and supporting panel 39. After the frame 38 has been pushed back, the mirror panel 22 may be swung forward to closed position. The outer edge 47 of panel 39 may form a stop for the front edge 48 of panel 22 when the latter is closed. It is seen from this that when the panels 22 and 39 are in normal closed position, they form part of the outer cabinet structure. As seen in Fig. 2, the projection path 36 is considerably longer than the width of the cabinet, whereby the pictures are thrown on screen 37 with the proper degree of magnification. The dimensions of the cabinet are so calculated that the screen 37 is just the right size for the pictures. When a 16 mm. film is used in projector P, the screen should preferably not be larger than 3½ by 5 feet. For larger projection, the mirror panel 22 is moved out of the way into position 22a, so that the light is thrown directly from mirror 34 on a screen suitably located at a distance from the cabinet. The screen 37 may be ground glass, a sheet of light-colored fabric (such as silk, cheesecloth, etc.) held taut in the frame, or any other translucent material suitable for the purpose.

I shall now describe the details of projector P, reference being had to Figs. 3 and 4. The various parts comprising the mechanism of the projector are mounted on a main frame indicated as a whole by F. In the present instance this frame is a casting having sides 49 and 50, a bottom plate 51, and a top plate 52. At one end of frame F are two brackets 53 and 54 provided with suitable bearings for supporting a pair of rotary shafts 55 and 56, respectively. These two shafts are adapted to receive at their free ends a pair of picture reels 57—58, and a pair of sound reels 59—60. That is to say—the upper shaft 55 carries the two pay-out reels 57 and 59, while the lower shaft 56 carries the two take-up reels 58 and 60. These reels are mounted side-by-side on their respective shafts, to which they are automatically locked when inserted, so that the reels always rotate in unison with the shafts. A hinged cross-pin 61 attached to the end of each shaft locks the reels against axial displacement and yet permits easy insertion and removal of the same. The inner reels 57 and 58 are adapted to support a motion picture film 62, and the outer reels 59—60 carry a synchronized sound film 63, which may be considerably narrower than the picture film.

Two sprocket wheels 64 and 65 are fixed on a rotary shaft 66 journalled at one end in the side wall 49 of the supporting framework. These two sprocket wheels always rotate in unison and may be formed as a single member with two pairs of sprocket teeth to engage the films 62 and 63 in the customary way. Between the reels and sprocket wheels both films are guided by two pairs of rollers 67 and 68. After leaving the sprocket wheel 64, the picture film 62 passes around rollers 69 which hold the film properly looped on either side of the gate 70 which guides it across the field of the optical system 35. This will be understood without further explanation. The sound film 63 after leaving the sprocket wheel 65 passes over rollers 71 which guide it through a sound unit 72. It is not necessary to show or describe the details of this sound unit, because it is well understood in the art how the sound track recorded on a photographic film controls the action of a photoelectric cell for generating corresponding current impulses which are fed into the driving unit of a loudspeaker. It will therefore be understood that when I refer to the mechanism 72 as a sound unit, I mean any practical arrangement for converting the sound track on film 63 into electric impulses adapted to actuate a loudspeaker. The sprocket wheels 64 and 65 are provided with spring-pressed hinged covers or shields 73 adapted to hold the films in operative engagement with the sprocket wheels. To prevent confusion in Figs. 3 and 4, I have purposely omitted the intermittent mechanism for picture film 62. The construction and operation of these mechanisms are so well understood as to require no detailed explanation here. Later on I shall describe a novel form of intermittent mechanism which is automatically cut out to permit rewinding of the films at high speed.

The reel shafts 55 and 56 are driven from sprocket shaft 66, which is supported at its inner end in a vertical partition 74, or in any other practical way. The inner ends of shafts 55 and 56 carry grooved pulleys 75 and 76, respectively, which are fixed to the shafts and arranged in line with similar pulleys 77 and 78 mounted loosely on sprocket shaft 66. A driving belt 79 connects pulleys 75 and 77, and the two pulleys 76 and 78 are connected by a similar belt 80. The loose pulleys 77 and 78 are spaced on sprocket shaft 66 to make room for a slidable clutch member 81 which is keyed to the shaft and always rotates therewith. The clutch member 81 is a ring provided at opposite ends with teeth adapted to be moved into locking engagement with like teeth on belt pulleys 77 and 78. Only one or the other of these pulleys can thus be connected to rotate with shaft 66. When the clutch ring 81 is moved toward the right (as viewed in Fig. 4) into engagement with pulley 78, the take-up shaft 56 is operatively connected to sprocket shaft 66 to unwind the films from the pay-out reels 57 and 59 onto the take-up reels 58 and 60 to project the picture on screen 37 with synchronized sound from film 63. During the unwinding of the reels, the pay-out shaft 55 is idle, being rotated solely by the pulling action of the films as they unwind. This idle operation of shaft 55 is permitted by pulley 77, which is at this time free on sprocket shaft 66. When the clutch member 81 is moved toward the left into engagement with pulley 77, the latter is coupled to the sprocket shaft 66 and the shaft 55 now becomes the driving shaft for reels 57 and 59, while the lower shaft 56 runs idle. This condition obtains during the rewinding of the film, as I shall presently explain in detail.

The sprocket shaft 66 is operated from a small electric motor 82 mounted on the bottom plate 51 and connected to an upright transmission shaft 83 in properly reduced gear ratio. The shaft 83, which is mounted in bearings 84 and 85, carries at its lower end a worm gear 86 and at its upper end a bevel gear wheel 87. The worm gear 86 is in mesh with a worm (not shown) on motor shaft 88, whereby the shaft 83 is rotated always in the same direction at a predetermined speed. The bevel gear 87 is permanently in mesh at diametrically opposite points with a pair of bevel gears 89 and 90 mounted loosely on a countershaft 91, which is suitably supported in framework F. An inner partition or bracket 92 may be used to support not only the countershaft 91, but also the sprocket shaft 66 at an intermediate point. A slidable clutch ring 93 is mounted on shaft 91 between the bevel gears 89 and 90. The opposite ends of clutch member 93 are provided with teeth adapted to interlock with teeth on bevel gears 89 and 90 to couple the latter to shaft 91. In other words, the clutch ring 93 always rotates with shaft 91, being keyed thereto in any practical way, but the bevel gears 89 and 90 rotate idly on the shaft until one or the other is coupled thereto by the clutch ring. The forward drive of the films during the projection operation is effected by coupling the bevel gear 90 to shaft 91, as shown in Fig. 4. When the clutch member 93 is moved into engagement with bevel gear 89, the rotation of shafts 91 and 66 is reversed to rewind the paid-out films. The operation of the reversing clutches 81 and 93 is accomplished automatically by electromagnetic means which I shall describe in due course.

It is well known that a motion picture film must be operated at a certain speed to project the successive frames at the rate of about sixteen per second, according to the established practice, although there are deviations from this rule. During the rewinding of the films, it is desirable (in fact, almost necessary in a household instrument) to use a higher speed so as to wind the films back on spools 57 and 59 in a comparatively short time. For example, a length of film that takes about fifteen minutes to unwind at projection speed ought to be rewound in about three minutes, or even less. For this purpose the sprocket shaft 66 is driven at greatly increased speed during the rewinding operation. This change of speed takes place through the following connections:

The countershaft 91 carries a small gear wheel or pinion 94 and a large gear wheel 95, both of which are permanently connected to the shaft. The pinion 94 is in mesh with a gear wheel 96 mounted loosely on sprocket shaft 66. A pinion 97 which runs idly on shaft 66 meshes with gear wheel 95. A clutch ring 98 is slidably keyed on shaft 66 between the gear members 96 and 97. The opposite ends of clutch ring 98 are provided with teeth adapted to interlock with similar teeth on the adjacent faces of gear members 96 and 97. When the clutch ring 98 is shifted into engagement with gear 96, the sprocket shaft 66 is coupled to the countershaft 91 in reduced ratio for driving the films forwardly at projection speed. During this operation the pinion 97 on shaft 66 runs idle and performs no useful purpose. When the clutch 98 is moved to the left (as viewed in Fig. 4) into engagement with pinion 97, the sprocket shaft 66 is operated at considerably greater speed than the countershaft 91, so that the rewinding of the films takes place in a correspondingly shorter time than the unwinding. The transmission ratios between the two pairs of meshing gears 94—96 and 95—97 are so calculated that the films are unwound at the proper speed and rewound at the desired increased speed.

The three clutch rings 81, 93 and 98 are shifted axially on their respective shafts from one position to the other by means of pivoted levers 99, 100 and 101, respectively. Each of these levers may be supposed to terminate in a yoke arranged to engage in the circumferential groove of the associated clutch ring, according to the usual way of operating slide clutches. It goes without saying that these yoke and groove connections do not interfere with the rotary movements of the clutch rings on their respective shafts. The lever 99 of clutch 81 is pivoted at 102 on a bracket 103 projecting from the side wall 49 of the main framework. The lever 100 of clutch 93 is pivoted at 104 on a suitable bracket 105 mounted on the top plate 52 of the framework. The lever 101 of clutch 98 is pivoted at 106 on a bracket 107 secured to the partition 74. The clutch levers 99 and 101 are connected by a link 108 for operation in unison. Therefore, when the clutch 98 is connected to gear 96 during the forward drive of sprocket shaft 66, the clutch 81 couples pulley 78 to the sprocket shaft, whereby the reel shaft 56 is driven at projection speed. At the same time, as already explained the pay-out shaft 55 runs idle, because the pulley 77 is loose on shaft 66. When clutch 98 is shifted by lever 101 to the left into engagement with pinion 97 to operate the sprocket shaft 66 in a reverse direction at increased speed, the clutch member 81 is simultaneously moved into coupling engagement with pulley 77 to drive the upper reel shaft 55 directly from the sprocket shaft through belt 79. During this reverse operation the shaft 56 runs idle, because the pulley 78 is loose on shaft 66. The operation of clutch levers 99 and 101 is accompanied by a corresponding operation of the third clutch lever 100, which controls the reversing clutch 93 on countershaft 91. When the clutch members 81 and 98 are shifted to the right, the lever 100 is actuated to move the clutch member 93 into engagement with bevel gear 90, whereby the countershaft 91 is driven in a forward direction. When the clutch levers 99 and 101 are rocked to the left (as viewed in Fig. 4) for the unwinding of the films, the clutch lever 100 is at the same time actuated to shift the clutch member 93 into engagement with the reverse bevel gear 89.

The reversing clutch lever 100 is controlled by a pair of electromagnets 109 and 110 which include energizing coils 112 and 113. The upper end 114 of lever 100 is in the form of (or otherwise carries) a magnetic armature movable between the pole pieces of the electromagnets. When coil 112 is energized, the lever 100 is rocked counterclockwise to move the clutch ring 93 into engagement with bevel gear 90. When coil 113 is energized, the lever 100 is rocked the other way to move the clutch ring 93 into engagement with the reverse bevel gear 89. Clutch lever 101 is operated by a pair of electromagnets 115 and 116 provided with coils 117 and 118. The lower end 119 of lever 101 either constitutes or otherwise carries an armature in operative relation to the poles of the oppositely arranged electromagnets 115 and 116. When coil 117 is energized, the two levers 99 and 101 are moved to the right to couple the sprocket shaft 66 to the countershaft 91 in reduced ratio, while at the same time the lower reel shaft 56 is connected to the sprocket shaft through belt 80. When coil 118 is energized, levers 99 and 101 are rocked to the left to move the clutch rings 81 and 98 into reverse position for unwinding the films at increased speed, as previously explained. When I come to describe the circuit diagram of Fig. 12, it will become clear how the coils 112 and 117 are simultaneously energized during the forward drive of the films, and how the unwound film itself automatically closes the circuit of coils 113 and 118 to reverse the driving connections for a rapid unwinding of the films.

I have already mentioned that the films 62 and 63 pass around rollers 67. The mounting of these rollers is best shown in Figs. 8 and 12. For distinction I have used the reference character 67′ to indicate the rollers associated with the sound film 63, the rollers for the picture film 62 being marked 67. Each pair of rollers 67—67′ is mounted on a shaft 120 conveniently supported on the side wall 49 of the main framework F. These rollers consist of good conducting metal, such as brass, and they need not be electrically insulated from each other. It is not necessary that the rollers 67—67′ are entirely of metal, for they may be insulating cylinders covered with a conducting surface, which should preferably be smooth so as not to mar the films. If the shafts 120 are rotatably supported, the rollers may be rigidly connected thereto, but if the shafts are fixed, then the rollers are mounted thereon for easy rotation. Each pair of rollers 67—67′ is associated with a movable switch unit indicated as a whole by S in Figs. 8 and 12. To differentiate between the two switch units in tracing the circuits, the lower switch unit (that is, the one near the take-up reels 58 and 60 in Fig. 3) has been marked S′. Since these two switch units are alike in structure, a description of one will suffice for both.

Each switch unit S—S′ has an insulating sleeve 122 rotatably mounted on a shaft 123 which projects from the side wall 49 of the main framework. The rotary sleeve 122 is provided with three arms 124, 125 and 126, and the free ends of these arms carry small contact rollers 127, 128 and 129 of brass or other good conducting metal. The outer arms 124 and 126 carry one roller each, but the middle arm 125 has two rollers electrically connected. The arms 124, 125 and 126 may be cast or molded integral with the insulating sleeve 122, as of bakelite or similar material, but they may be attached to the sleeve as separate pieces. The outer arms 124 and 126 are preferably of metal to act as terminals for conductors 130 and 131. The outer contact rollers 127 and 129 normally ride over (or under) the outer edges 62′ and 63′ of films 62 and 63, while the inner contact rollers 128 normally engage the inner edges 62a and 63a of the films. This will be clear from Fig. 6, where the two films have for convenience been shown of the same width, although in reality the sound film 62 will probably be narrower than the picture film 63.

As long as the switch rollers 127, 128 and 129 are held out of contact with the associated guide rollers 67 and 67′ by the insulating films 62 and 63, the circuits of the four clutch coils 112, 113, 117 and 118 are open. When these switch rollers, however, engage the metal guide rollers 67 and 67′, certain operations are automatically performed, as will presently be explained in connection with the circuit diagram of Fig. 12. The normal width of films 62 and 63 covers the associated rollers 67 and 67', so that the switch rollers 127, 128 and 129 are held open by the film itself, which is of insulating material. Referring to Fig. 6, it is seen that the films have narrow end portions 132 and 133. It may be assumed that the films begin at 132 and end at 133. When the switch rollers 127, 128 and 129 run off the films at 134, they come into electrical contact with guide rollers 67 and 67', which establish an electrical connection between the terminal arms 124 and 126 of the switch unit S or S'. When the ends 132 of the films are threaded into the take-up reels 58 and 60, switch S' is closed until the switch rollers 127, 128 and 129 ride over the broad sections of the films. In Fig. 6 the arrow $a$ is supposed to indicate the forward movement of the films during projection, while the arrow $b$ indicates the reverse movement to rewind the films on reels 57 and 59. Instead of providing the films with narrow ends 132 and 133 to close the circuits of the clutch coils, the same result is obtained by leaving the film of uniform width but providing it with longitudinal slots 135 (see Fig. 7) through which the switch rollers engage the guide rollers 67 and 67'.

The movable switch units S and S' are so mounted that they are easily moved away from the guide rollers 67 and 67' to permit threading of the films from one reel to the other across their respective optical fields. To facilitate this manipulation of switches S and S', they are provided with an insulated handle 136, as shown in Fig. 11. A contracting coil spring 137 is attached at 138 to arm 126, and the other end of the spring is connected to a fixed point 139 on the side wall 49 of the framework. When the switch unit S or S' is in normal position against the guide rollers 67 and 67', the pull of spring 137 holds the switch rollers in yieldable pressure contact against the film. When the switch is swung into inoperative position, as indicated by the dotted outline in Fig. 11, the spring 137 holds the switch against a stop 140. The switches are easily moved from one position to the other by merely pressing against the handle 136 with a finger tip.

Referring to Fig. 12, one side of clutch coil 112 is connected by wire 141 to a movable switch arm 142, and the other side of the coil is connected by wire 143 to the circuit main 144, which leads from a battery 145 or other source of current. One side of the other clutch coil 113 is connected to circuit lead 144 by wire 146, and the other side of this coil is connected by wire 147 to a movable switch arm 148. A circuit lead 149 is connected at one end to battery 145 and at the other end to a pair of switch contacts 150 and 151. The movable switch arms 142 and 148 are simultaneously actuated by the pivoted clutch lever 101 through an insulating link 152, or in any other practical way. One side of clutch coil 117 is connected by wire 153 to the terminal arm 126 of switch S', and the other side of this coil is connected by wire 154 to circuit lead 155 of battery 156, or other source of current. Clutch coil 118 is connected at one end by wire 157 to circuit lead 155 and at the other end to wire 130, which is connected to terminal arm 124 of switch S. The terminal arm 124 (or contact roller 127) of switch S' is connected to circuit lead 158, which is also connected by wire 131 to the terminal arm 126 (or contact roller 129) of switch S. The separately shown batteries 145 and 156 are supposed to represent the same source of power, which may be the house-lighting system that provides current for all the circuits in cabinet C.

In tracing the circuit connections of Fig. 12, we shall assume that the ends 132 of films 62 and 63 have been threaded into the take-up reels 58 and 60, and that the circuit of electric motor 82 is closed. Since the contact rollers of switch S' are now in engagement with the metal guide rollers 67 and 67', the circuit of the forward clutch coil 117 is closed as follows: Battery 156, conductors 155 and 154, coil 117, wire 153, through closed switch S' and return conductor 158. The clutch lever 101 is therefore rocked clockwise (as viewed in Figs. 4 and 12) to shift the clutch ring 98 into engagement with gear 96 on sprocket shaft 66, as previously described in detail. At the same time, the clutch lever 101 closes the switch contacts 142—150 and opens the switch contacts 148—151. This means that the circuit of battery 145 is closed through clutch coil 112, which instantly rocks the associated lever 100 in a counter-clockwise direction to shift the clutch ring 93 into engagement with bevel gear 90 to drive the countershaft 91 in a forward direction. The reversing clutch coils 113 and 118 are out of circuit, because the switch 148—151 is open and because the movable switch unit S is held open by films 62 and 63. As soon as the contact rollers of switch unit S' ride over the insulating surface of the films, the circuit of clutch coil 117 is interrupted, but the clutch lever 101 is held in actuated position by a tensioned coil spring 159, which is connected to the lever at 160 above the pivot axis 106. The lower end of spring 159 is connected to a fixed point 161. The spring 159 is so arranged that its line of pull crosses the pivot axis 106 when the lever 101 moves from one position to the other, whereby the spring holds the lever in either position independently of the electromagnets 115 and 116.

The forward movement of films 62 and 63 continues at projection speed until the operative section of the films has been paid out. In other words, when the picture and sound have come to an end, the contact rollers of switch S ride off the edges of the films into engagement with guide rollers 67 and 67', as shown in the upper portion of Fig. 6. When this occurs, the circuit through reversing coil 118 is closed as follows: Battery 156, wires 155 and 157, coil 118, wire 130, through switch S, which is now closed, wire 131 and through return conductor 158 to the battery. The energized electromagnet 116 instantly attracts the armature 119 and lever 101 is rocked counterclockwise to connect the clutch ring 98 with pinion 97 on sprocket shaft 66, as previously explained. This movement of lever 101 also opens the switch contacts 142—150 of coil 118 and closes the switch contacts 148—151 of reversing coil 113 (see Fig. 12). Consequently, lever 100 is moved clockwise to shift the clutch ring 93 into engagement with bevel gear 89 which reverses the rotation of shaft 91. The result of this shifting of clutches is the rewinding of films 62 and 63 at highly increased speed, as more fully explained in connection with Fig. 4. When the films are fully rewound, the circuit of motor 82 is opened either by hand or automatically. The films 62 and 63 are now in their initial position on reels 57 and 59, which may now be removed for replacement by other films, or they may be played over again. This automatic rewinding of the films at the conclusion of a picture is of great practical importance, because it leaves the films in condition for the next projection. The films are thus always ready for use, like a phonograph record.

It is not necessary that the movable switch units S and S' have four contact rollers arranged to engage the film along both edges, for it is possible to obtain the same circuit control by using only two rollers as shown in the modification of Fig. 9. We have here an insulating sleeve 162 rotatably mounted on shaft 123 and carrying a pair of conducting arms 163 and 164, which may be used as binding posts for connecting the necessary circuit conductors. The switch arms 163 and 164 carry contact rollers 165 and 166 arranged in line with the inner edges of guide rollers 67' and 67. As long as rollers 165 and 166 engage the films 63 and 62, the switch arms 163 and 164 are electrically disconnected. When, however, these contact rollers ride off the films, in the manner previously explained in connection with Figs. 6 and 7, the switch arms 163 and 164 are electrically connected through rollers 165, 67', 67 and 166. Otherwise, what has been said for the operation of switches S and S' in Fig. 12 is fully applicable to the switch of Fig. 9. Each pair of guide rollers 67—67' can be replaced by a single cylinder, since the films 62 and 63 are supposed to operate at like speeds. It will be noticed that the contact rollers of the switches in Figs. 8 and 9 never engage the operative area of the films, so that neither the picture nor the sound track is in danger of being ruined by these rollers.

The circuit of electric motor 82 is closed and opened by a suitable hand switch 167, which may be attached to the front wall 49 of the projector framework F, as shown in Fig. 3. The motor switch should be off when the films are threaded through the projector. After the films have been automatically rewound, as previously explained, the motor switch 167 is opened. This, of course, requires the presence of a person to watch when the films have been unwound from the lower reels 58 and 60. In a preferred embodiment of my invention, I include provisions for automatically opening the motor circuit when the films are rewound on reels 57 and 59.

Referring to Figs. 15 and 16, the outer edges of films 62 and 63 are engaged by grooved rollers 168 and 169 mounted on right-angled arms 170 and 171, which are pivoted on pins 172 carried by a suitable frame or casing 173 attached to the adjacent wall 49. The rollers 168 and 169 are preferably of insulating material, which subjects the films to practically no wear. A light coil spring 174 is connected to the lateral extension 175 of each arm 170 and 171 to hold the rollers 168 and 169 pressed gently against the edges of films 62 and 63. This lateral pressure against the films is resisted by the flanges 68' of guide rollers 68. The pivoted arms 170 and 171 are provided with insulated metal extensions 176 and 177, which are in contact with a switch member 178 as long as the rollers 168 and 169 engage the films. The switch member 178 may be a single spring arm or plate mounted at the center on an insulating post 179 of frame 173. One side of the motor circuit is connected to switch contact 176 by conductor 180, and the other switch contact 177 is connected to the same conductor by wire 181. A main circuit conductor 182 leading from plug 183 is connected to the switch arm 178, and the other circuit main 184 leads to the motor. The hand switch 167 is diagrammatically indicated in Fig. 16 as being inserted in lead 184. If the frame or casing 173 is made of sheet metal, the pivot pins 172 of arms 170 and 171 may be supported on lugs 173' struck up from the bottom of the casing. A hinged cover 173a permits ready access to the interior of casing 173, which is slotted at the sides for the passage of the films. The arms 170 and 171 may be of insulating material, so that no special insulation is required for contact members 176 and 177.

Still referring to Fig. 16, it is evident that, as long as one or both of the rollers 168 and 169 engage the edge of the associated film, the contact arms 176 and 177 are held in firm pressure engagement with switch member 178 to close the circuit of motor 82. This assumes, of course, that the hand switch 167 is closed. When the films 62 and 63 pass out of engagement with the films after these have been almost fully wound back on reels 57 and 59, the tensioned coil springs 174 quickly rock the pivoted arms 170 and 171 toward each other and thereby move the contacts 176 and 177 away from switch member 178. The motor circuit is thus abruptly opened and all the driving connections of the projector are stopped. When the next films are threaded past the guide rollers 68 and switch rollers 168—169, the switch arms 176 and 177 are automatically moved into contact with spring member 178. This, however, does not start the motor, because it is supposed that the hand switch 167 is not closed until the films have been threaded into the lower take-up reels 58 and 60. The pivoted switch arms 170 and 171 may be so arranged that the contacts 176 and 177 move into open position when the rollers 168 and 169 encounter the narrow section 132 of the films. On the other hand, the construction of this automatic switch may be such that the contact arms 176 and 177 do not break the circuit until the films have moved entirely past the rollers 168 and 169. Fixed stops 175' may be provided to limit the movement of arms 170 and 171 into open position, but ordinarily the bottom of casing 173 will perform that function. The stops 175' may simply be cross pins mounted in the sides of casing 173.

Although the projector P is primarily intended for exhibiting talking movies by the simultaneous operation of picture film 62 and sound film 63, the projector may be operated with either film alone. When the sound film 63 is used without the picture film, we have an acoustic reproduction similar to that of a phonograph. In fact, the projector may be called a phonograph in which the sound film 63 constitutes the record by which the sound is reproduced. It is to be noted that the automatic circuit operations described in connection with Figs. 12 and 16 take place not only when both films are in the machine at the same time, but also when either the picture film or the sound film is used alone. This is a valuable feature, because it increases the practical utility of the machine without the necessity of any adjustments. In the broader aspect of my invention, the films 62 and 63 may be combined in one film in which the sound track is arranged along one edge. While this reduces the width of the picture, it also simplifies the projector construction. Personally I prefer a separate sound film, because it can be treated optically and chemically apart from the picture film.

In the projector of Figs. 3 and 4, the picture film 62 and sound film 63 are reeled off at the same speed. On that account the pairs of adjacent reels 57—59 and 58—60 can each be made as a single reel with two compartments, one for the picture film 62 and the other for the sound film 63. In some instances, however, it may be desirable for the best results to operate the sound film faster than the picture film. This obviously takes it for granted that the same difference in speed was observed during the filming and recording operations. Some acoustic engineers believe that a clear reproduction of the higher frequencies requires the sound film to pass through the recording unit at a greater speed than is necessary for filming a picture. This, of course, can be done only in that type of apparatus where the sound film is separate from the picture film. For those cases where the sound film is operated at higher speed than the picture film, I have provided a projector like that shown in Fig. 5, which I shall now describe.

The electric motor 82 is connected to a vertical drive shaft 185 through worm 186 on the motor shaft and gear 187 on the drive shaft, which is mounted in suitable bearings 188 and 189 in the main framework F". The upper end of shaft 185 carries a bevel gear 190, which is permanently in mesh at diametrically opposite points with bevel gears 191 and 192 loosely mounted on a horizontal countershaft 193. The ends of shaft 193 are journalled in the sides 194 and 195 of the supporting framework and an intermediate bearing 196 may be provided if desired. A clutch ring 197 keyed to shaft 193 is slidably mounted between the bevel gears 191 and 192, which are provided with teeth adapted to engage the teeth projecting from opposite ends of the clutch ring. A lever 198 pivoted at 199 is connected at its lower end to clutch ring 197 to shift the same into coupling engagement with either of the bevel gears 191 and 192, so as to drive the shaft 193 in a forward or reverse direction. The upper end 200 of lever 198 is in the form of (or otherwise carries) a magnetic armature 200 arranged to move between the poles of a pair of oppositely arranged electromagnets 201 and 202, which are provided with coils 203 and 204 respectively.

A second clutch ring 205 is slidably keyed to countershaft 193 between a pinion 206 and a gear wheel 207, both of which are loose on the shaft. A lever 208 pivoted at 209 is operatively connected at its lower end to the slidable clutch ring 205 for shifting the same into locking engagement either with pinion 206 or gear wheel 207. For this purpose the clutch ring 205 is provided at opposite ends with teeth arranged to mesh with similar teeth on the adjacent faces of gear members 206 and 207. The pinion 206 on shaft 193 is permanently in mesh with a large gear 210 fixed on the sprocket shaft 211, which is journalled in bearings 212 and 213 of framework F". The sprocket shaft 211 also carries a pinion 214 permanently meshing with the large gear 207 on countershaft 193. The gear members 210 and 214 are secured to the sprocket shaft 211 so as to rotate therewith. It is clear from Fig. 5 that when the two horizontal shafts 193 and 211 are connected through gear members 206 and 210, the sprocket shaft is driven at reduced speed during the projecting operation. However, when those two shafts are coupled through gear members 207 and 214, the sprocket shaft 211 is operated at greatly increased speed for quickly rewinding the films to their original condition on reels 57 and 59. When the clutch rings 197 and 205 are moved to the left, as shown in Fig. 5, the sprocket shaft 211 is coupled to the countershaft 193 for unwinding the films, and when the clutch rings are shifted to the right, the countershaft is rotated reversely and is coupled to the sprocket shaft 211 in amplified transmission ratio for a quick rewinding of the films. The clutch members 197 and 205 are connected by a link 215 for simultaneous operation.

The supporting framework F" is provided on top with a bearing 216 for rotatably supporting a sleeve 217 and a shaft 218. The sleeve 217 carries the picture reel 57 and the shaft 218 carries the sound reel 59. A simple way to connect the reels to their respective sleeve and shaft is by the ordinary key and slot joint, which permits easy removal of the reels. The inner end of sleeve 217 carries a grooved pulley 219 and the inner end of shaft 218 carries a smaller pulley 220. The pulley 219 is connected by a driving belt 221 with a pulley 222 fixed on sprocket shaft 211, and the pulley 220 of shaft 218 is connected by a driving belt 223 to a second pulley 224 on the sprocket shaft. The pulleys 222 and 224 may be formed as a grooved hub integral with pinion 214. These parts can readily be cast as a single piece of aluminum, or molded as one piece of bakelite. The mounting of the take-up reels 58 and 60 is the same as the above described mounting of the pay-out reels 57 and 59, so I need only say that the picture reel 58 is supported on a rotary sleeve 225, while the sound reel 60 is supported on a rotary shaft 226 passing through sleeve 225. A grooved pulley 227 on sleeve 225 is connected by a driving belt 228 to a grooved pulley 229 fixed on sprocket shaft 211. A smaller pulley 230 on shaft 226 is connected by a driving belt 231 to a pulley 232 fixed on the sprocket shaft. What has been said about the structure of pulleys 222 and 224 applies to pulleys 229 and 232. It goes without saying that the four pulleys on sprocket shaft 211 are substantially the same in diameter. The pulleys 219 and 227 which drive the sleeves 217 and 225, respectively, are supposed to be of the same size, and the same is true of the smaller pulleys 220 and 230 on the reel shafts 218 and 226.

Shaft 211 carries a small sprocket wheel 233 for the picture film 62 and a large sprocket wheel 234 for the sound film 63. These two sprocket wheels may constitute a single casting, as of aluminum. It is clear from Fig. 5 that the reel shafts 218 and 226 are driven from the sprocket shaft 211 at a greater rate of speed than the sleeves 217 and 225 which carry the picture reels. This speed relation also exists in the sprocket wheels 233 and 234, which feed the sound film faster than the picture film. The relative transmission ratios between the countershaft 193, sprocket shaft 211, sleeves 217 and 225, and shafts 218 and 226, are so calculated that the picture film 62 and sound film 63 are projected at the same relative speed at which they were paid out in the filming and recording apparatus. When the clutch rings 197 and 205 are shifted to the left for the projecting operation, the sleeve 225 of reel 58 and shaft 226 of reel 60 are in positive driving connection with countershaft 193. On shifting the clutch rings 197 and 205 to the right, the rotation of shaft 193 is reversed and the sprocket shaft 211 is driven through gear members 207 and 214 at increased speed, so that the films are quickly wound back on reels 57 and 59. During the rewinding operation the speed relationship of the two films is the same as during the projection of the films. The four driving belts 221, 223, 228 and 231 are preferably coil springs which allow the necessary slipping of the connected pulleys, so that the reels 57—59 and 58—60 turn at varying speeds during the projecting and rewinding operations, respectively, to pay out the film as required. Instead of connecting the gear members 210 and 214 permanently to sprocket shaft 211, I may use the clutch arrangement 77—78—81 of Fig. 4.

Fig. 13 shows diagrammatically the circuit connections for the clutch coils 203 and 204 of Fig. 5. A circuit lead 235 connects one side of coils 203 and 204 with terminal 236 of battery 237 or the house-lighting circuit. The other terminal 238 of the main circuit is connected to a conductor 239. The film controlled switch mechanism of Fig. 9 has been incorporated in Fig. 13. For convenience I have designated the upper and lower switch mechanisms in Fig. 13 by the reference characters W and W', respectively. The contact rollers 165 (or metal arms 163) of switches W and W' are connected to the ends of conductor 239. A wire 240 connects one side of coil 204 with contact roller 166 of switch W, and a wire 241 leads from one side of coil 203 to roller 166 of switch W'. These conductors may conveniently be attached to the metal arms 164 on which the rollers 166 are mounted. When the narrow end portions 132 of films 62 and 63 are passed over the guide rollers 67 and 67' of switch W', the small contact rollers 165 and 166 of that switch are in engagement with the metallic guide rollers, so that the circuit of clutch coil 203 is closed to rock the pivoted levers 198 and 208 to the left (as viewed in Fig. 5), whereby clutch ring 197 engages bevel gear 191 and clutch ring 205 engages pinion 206. The films are therefore driven in a forward direction at correct relative speeds, as heretofore explained.

When the contact rollers 165 and 166 of switch W' are separated from the guide rollers 67 and 67' by the insulating films, the circuit of coil 203 is opened, but the clutch lever 198 is held in operated position by the tensioned coil spring 242, which acts like the coil spring 159 connected to clutch lever 101 of Fig. 12. As long as the contact rollers 165 and 166 of switch W engage the operative or wide sections of films 62 and 63, the circuit of coil 204 remains open. However, after the films have been fully paid out across their respective optical fields, the contact rollers 165 and 166 of switch W ride off the films into direct engagement with the metal rollers 67 and 67'. The circuit of coil 204 is now closed to move the clutch levers 198 and 208 counterclockwise and thereby shift the clutch rings 197 and 205 against the gear members 192 and 207, respectively. The sprocket shaft 211 is now operated reversely at greatly increased speed to rewind the films. The automatic motor stop of Fig. 16 may be applied to the projector of Figs. 5 and 13. It is hardly necessary to state that the switches S and S' of Fig. 12 may be used in Fig. 13, and that the switches W and W' of Fig. 13 may be substituted in Fig. 12. In fact, any practical form of switch may be used to control the operation of the clutches by the film itself, and the switches S and W are therefore to be regarded merely in an illustrative sense.

I mentioned some time ago that the intermittent mechanism for picture film 62 was omitted in Figs. 3, 4 and 5, to avoid needless complication of the drawings. There are various forms of intermittent mechanisms embodied in motion picture cameras and projectors to be found in the market, and the projectors of Figs. 3, 4 and 5 may be equipped with any one of those prior intermittent movements. However, I have devised a novel form of intermittent mechanism which remains out of engagement with the film during the rewinding operation at high speed, so as to obviate all danger of the film being torn or otherwise injured. This new intermittent movement may be embodied in either or both of the projectors shown in Figs. 3, 4 and 5. Referring to Fig. 10, an arm 243 is pivotally connected to a disk 244 by means of a crank pin 245. The disk 244 is mounted on a shaft 246 which also carries a pinion 247. If the shaft 246 is fixed, the cam disk 244 and pinion 247 rotate thereon as a unit. The parts 244 and 247 are fixed on shaft 246 if the latter is rotatably supported. A gear 248 loosely mounted on sprocket shaft 211 (see Figs. 5 and 5a) is provided with a ratchet hub or pinion 249 arranged to be engaged by a pawl 250 pivoted at 250' on the grooved hub of gear 210. A spring 251 holds the tip of pawl 250 against the teeth of ratchet wheel 249. An intermediate gear 252 on a shaft or spindle 252' connects gear 248 with pinion 247. The free end of arm 243 is provided with spaced fingers 253 arranged to enter a pair of sprocket holes at each edge of the film. A fixed pin 254 extends transversely through a longitudinal slot 255 in arm 243, whereby the latter is guided in its up and down movements.

It is clear from Fig. 10, as the cam disk 244 rotates clockwise at properly timed speed, the fingers 253 of arm 243 are first moved into gripping engagement with the sprocket holes of the film and then the arm moves down to pull the film with it the distance of one frame. This, of course, happens only during the dark intervals of the projection. After the arm 243 has reached its lowermost position, continued rotation of cam disk 244 moves the fingers 253 to the left (as viewed in Fig. 10) out of engagement with the film, which therefore remains stationary until the fingers are again moved forward into operative position. It is evident from Fig. 5a that when the gear 210 rotates in the direction of arrow c during the projecting operation, the pawl 250 and ratchet wheel 249 are coupled, so that gear 248 is rotated to actuate the intermittent arm 243. However, when gear 210 is driven in the opposite direction during the rewinding operation, the pawl 250 rides idly over ratchet wheel 249 and the gear 248 remains stationary. This means that the intermittent arm 243 does not operate when the films are wound back on reels 57 and 59. A coil spring 256 connected to arm 243 normally tends to hold the latter away from film 62. Consequently, during the rewinding operation when the pinion 247 is disconnected from the sprocket shaft, the tensioned spring 256 pulls the arm 243 into inoperative position and holds it there. This makes it possible to rewind the picture film at greatly increased speed without interference from the intermittent arm 243. The sound film 63 requires no intermittent mechanism.

In connection with Fig. 1, I called attention to the switch knob 19 on the front panel of the cabinet for connecting the loudspeaker 14 either with the sound unit of the projector or with the output of the radio receiver. A simple circuit diagram for establishing these operative connections is illustrated in Fig. 14. The terminals 257 and 258 are supposed to be connected to the output circuit of the sound unit, while the terminals 259 and 260 are connected to the output circuit of the radio set. This will be understood without further explanation. The finger piece 19 operates an insulating disk 261 provided with a radial cam lug or projection 262, which may be cast or molded integral with the disk, as of bakelite. A pair of fixed stops 263 and 264 limit the rotation of disk 261. The cam lug 262 controls a pair of switches consisting of contact arms 265—266 and 267—268. At least the arms 265 and 267 are in the form of movable spring blades provided each with a recess or offset 269 for receiving the tip of cam lug 262 in releasable locking engagement. These two switches are normally open by the inherent set or tension of arms 265 and 266, but the latter are moved into closing position by cam 262. The driving unit 15 of loudspeaker 14 is connected at one side by wire 270 to switch arm 266, and connected at the other side by wire 271 to the radio output terminal 259. The talkie output terminal 258 is connected by wire 272 to the same side of the driving unit 15 as radio terminal 259. A wire 273 connects switch arm 268 to wire 270, so that the switch arms 266 and 268 are connected in parallel to the same side of loudspeaker unit 15. A wire 274 connects the talkie output circuit 257 to the movable switch arm 265 and a wire 275 connects switch arm 267 with the radio output terminal 260. When the finger piece 19 is turned to the left, as shown in Fig. 14, switch 265—266 is closed and the sound unit of the projector is connected to the loudspeaker unit 15. When finger piece 19 is turned toward the right until the cam disk 261 encounters stop 264, the cam lug 262 closes switch arms 267—268, whereby the loudspeaker unit 15 is operatively connected to the output circuit of the radio receiver.

In Fig. 4 there is a gear 276 fixed on sprocket shaft 66 for operating any suitable intermittent mechanism, but I prefer a mechanism that is automatically cut out of operation during the rewinding of the films, as above described. Although the intermittent device of Fig. 10 has been considered as part of the projector in Fig. 5, it is evident that it may be applied to the construction of Figs. 3-4. This will be fully understood from Fig. 17, where the sprocket shaft 66 has a gear wheel 277 loosely mounted thereon adjacent the clutch pulley 77. A disk 278 fixed on shaft 66 carries a pivoted pawl 279 arranged to engage the teeth of a ratchet pinion 280 attached to (or forming part of) the gear wheel 277. A suitable spring (like spring 251 in Fig. 5a) holds the tip of pawl 279 pressed against the ratchet teeth. When the sprocket shaft 66 is driven forward during the projecting operation, the pawl and ratchet connection 279—280 drives the gear 277, which operates the intermittent arm 243 of Fig. 10. In this figure we may assume gear 248 replaced by gear 277. During the reverse rotation of sprocket shaft 66 for rewinding the films, the pawl 279 slips over the ratchet wheel 278 without actuating the same, so that gear 277 and arm 243 remain stationary to permit a rapid rewinding operation.

The projectors in Figs. 3, 4 and 5 carry lamps of requisite candle power and properly arranged for the projection of the picture film and for the operation of the sound unit. To avoid needless complication in the drawings, these lamps have been omitted, especially since their operative arrangement is well understood.

In Fig. 5 the pulleys 222, 224, 229 and 232 are permanently keyed to sprocket shaft 211, so that the driving belts 221, 223, 228 and 231 are always operated. However, as previously explained, these belts are so constructed as to permit slipping of pulleys 219—220 during the unwinding operation and slipping of pulleys 227—230 during the rewinding of the films. In some cases it may be advisable or even necessary to disconnect the sprocket shaft 211 from reels 57—59 during the projecting operation and from reels 58—60 during the rewinding operation. This result is obtained by the novel driving mechanism shown in Fig. 18, which is intended to be substituted for the ratchet drive of Figs. 5 and 5a. Referring to Fig. 18, the sprocket shaft 211 has two driving members 281 and 282 loosely mounted thereon. Each of these members may be a single casting to provide a pair of grooved pulleys and a ratchet wheel. The pulleys 222 and 224 in member 281 receive the driving belts 221 and 223, while the pulleys 229 and 232 in member 282 receive the belts 228 and 231, the same as in Fig. 5. The pinion 206 and gear 207 on countershaft 193 mesh respectively with a gear 283 and a pinion 284 fixed on sprocket shaft 211. A gear 285 loosely mounted on shaft 211 is provided with a ratchet wheel 286 adapted to be engaged by a pawl 287 pivoted on one side of gear 283. A second pawl 288 on the other side of gear 283 engages the teeth of ratchet wheel 289 on member 282. The ratchet wheel 290 on member 281 is engaged by a pawl 291 pivoted on pinion 284. Each pawl is held against the associated ratchet teeth by a suitable spring, similar to the arrangement shown in Fig. 5a. It is understood that gear 285 takes the place of gear 248 in Fig. 10 for operating the intermittent arm 243. When the sprocket shaft 211 is rotated forward at projection speed through gear connection 206—283, the pulley member 282 and gear 285 are coupled to the shaft through their respective pawl and ratchet arrangements. Consequently, the belts 228 and 231 positively drive the take-up reels 58 and 60, and gear 285 operates the intermittent mechanism of the picture film. The pulley member 281 is stationary, so that the pay-out reels 57 and 59 are free to rotate as required under the pulling action of the unwinding films. When the sprocket shaft 211 is rotated in the reverse direction at increased speed through gear connection 207—284, the pulley member 281 is coupled to pinion 284 by the pawl and ratchet drive 291—290, whereby the reels 57 and 59 are positively driven by the sprocket shaft for rewinding the films. At the same time, the gear 285 and pulley member 282 remain stationary because the pawls 287 and 288 ride idly over the associated ratchet wheels 286 and 289.

Although I have shown and described specific constructions, the various features of my invention may be mechanically embodied in other forms than herein set forth. Changes and modifications will probably occur to the skilled mechanic without departing from the scope of the invention as defined in the appended claims. Furthermore, it is evident that some features of my invention may be used without certain other features.

I call attention to my pending application Serial Number 351,240, filed March 30, 1929, which contains subject matter related to the present invention.

I claim as my invention:

1. A talking movie machine having means for unwinding and rewinding a film which is provided near each end with integral operating means arranged within the normal width and thickness of the film, means for automatically reversing the film when unwound, and means for automatically stopping the film when rewound, said reversing means and stopping means being controlled by said operating means and being wholly independent of the speed of the film, said stopping means remaining inoperative when the film is unwound from its initial condition.

2. A talking movie projector having a pair of picture reels and a pair of sound reels mounted for independent movement, reversible driving mechanism for said pairs of reels, and a single electric motor operatively connected to all of said reels and to said reversing mechanism, there being transmission connections from the motor to the picture reels independent of transmission connections from the motor to the sound reels.

3. A talking movie projector having a pair of picture reels and a pair of sound reels mounted for independent movement, reversible driving mechanism for said pairs of reels, a single electric motor operatively connected to all of said reels and to said mechanism, there being transmission connections from the motor to the picture reels independent of transmission connections from the motor to the sound reels, and means for controlling said mechanism by the film on the reels.

4. A film-operating machine having reversible driving mechanism for operating the film reels at greater speed during the rewinding than the unwinding of the film, means for automatically controlling said mechanism by the film itself, said controlling means including a cut-away portion of the film arranged at a predetermined distance from one end of the operative section of said film, and means independent of the speed of the film for automatically stopping the film when rewound on the initial supply reel, said stopping means remaining inoperative when the film is wound up on the initial take-up reel.

5. A film-operating machine having reels for operatively supporting a film, reversible driving mechanism for said reels, said mechanism including connections for operating the reels at greater speed during the rewinding than during the unwinding of the film, and means controlled by the film for automatically stopping the film when rewound, said film-stopping means operating independently of the speed of the film and remaining inoperative when the film is wound up on the initial take-up reel.

6. A film-operating machine having reels for operatively supporting a film, a shaft rotatable in the same direction at predetermined speed, reversible driving connections between said shaft and said reels for rewinding the film at greater speed than that of the unwinding operation, and means independent of the speed of the film for automatically stopping said shaft when the film is rewound on the initial supply reel, said stopping means remaining inoperative when the film is wound up on the initial take-up reel.

7. A film-operating machine having reels for operatively supporting a film, reversible driving mechanism for said reels, electromagnetic means for controlling said mechanism, switch means controlled by the film for operating said electromagnetic means to cause rewinding of the film by said mechanism, and other switch means controlled by the film for stopping said mechanism when the film is rewound, both of said switch means operating independently of the speed of the film, said film-stopping switch means remaining inoperative when the film is wound up on the initial take-up reel.

8. A talking movie projector having a pair of rotary hollow shafts for supporting a pair of film reels, a shaft extending through each of said hollow shafts, a second pair of film reels mounted on said inner shafts, a rotary driving member, transmission connections between said driving member and said hollow shafts, and other transmission connections between said driving member and said inner shafts.

9. A talking movie projector having a pair of rotary hollow shafts for supporting a pair of film reels, a shaft extending through each of said hollow shafts, a second pair of film reels mounted on said inner shafts, a driving member connected to said hollow shafts and to said inner shafts, and means whereby said driving member operates one pair of these shafts at greater speed than the other pair of shafts.

10. A film-operating machine having reels for operatively supporting a film, reversible driving mechanism for said reels, electromagnetic means for controlling said mechanism, switch means controlled by the film for operating said electromagnetic means to cause rewinding of the film by said mechanism, variable transmission connections whereby said mechanism operates said reels at greater speed during the rewinding than during the unwinding of the film, and other switch means controlled by the film for stopping said mechanism when the film is rewound, both of said switch means operating independently of the speed of the film, said film-stopping switch means remaining inoperative when the film is wound up on the initial take-up reel.

11. In a machine of the class described, the combination of means for unwinding and rewinding a length of film provided near each end with integral operating means arranged within the normal width and thickness of the film, means for automatically reversing the film when unwound, and means for automatically stopping the film when rewound, said reversing and stopping means being controlled by said operating means and being independent of the speed of the film, said stopping means remaining inoperative when the film is unwound from its initial condition.

12. A motion picture machine having reversible film-driving mechanism normally in condition to drive the film forward, means for automatically reversing the operation of said mechanism when the film is unwound, and means controlled by the rewound film for automatically stopping said mechanism and returning it to normal condition, said film-stopping means operating independently of the speed of the film and remaining inoperative when the film is unwound from its normal or initial condition.

13. A motion picture machine having a film-driving shaft, an electric motor for operating said shaft in both directions for unwinding and rewinding of the film, an adjustable member controlled by the film for reversing the rotation of said shaft when the film is unwound, and means controlled by the rewound film for stopping said motor and moving said member back to normal position, said film-stopping means operating independently of the speed of the film, and remaining inoperative when the film is unwound from its normal or initial condition.

14. In a machine of the class described, the combination of a pair of rotary spools adapted to support a film for unwinding and rewinding, a driving shaft for said spools, an electric motor connected to said shaft, two adjustable clutch members in the transmission connections between said motor and shaft, one of said clutch members controlling the direction of rotation of said shaft and the other clutch member controlling the speed of said shaft, and means for simultaneously moving both clutch members to engaging position.

15. A motion picture machine having a pair of reels adapted to support a film for unwinding and rewinding, a film-driving shaft, an electric motor geared to said shaft, said gear connection including an adjustable clutch member to reverse the rotation of said shaft, an electromagnetic device for operating said clutch member, film-controlled switch means for energizing said device when the film is unwound to reverse the rotation of said shaft, whereby the unwound film is automatically rewound, other switch means controlled by the film when rewound for again energizing said device to move said clutch member back to normal position, whereby said shaft is connected to the motor for forward movement of the next film, and means controlled by the rewound film for stopping said motor, all of said film-controlled means operating independently of the speed of the film, said film-stopping switch means remaining inoperative when the film is wound up on the initial take-up reel.

16. In a machine of the class described, the combination of a pair of rotary spools adapted to support a film for unwinding and rewinding, a driving shaft for said spools, sprocket means operated by said shaft and arranged to engage the film, an electric motor, two gear connections betwen said motor and shaft to operate the latter at increased speed during the rewinding of the film, an adjustable clutch member for rendering either one of said gear connections operative, means for automatically reversing the rotation of said sprocket shaft when the film is unwound, and means for automaticaly operating said clutch member to connect said shaft for high-speed operation when the shaft is reversed to effect rewinding of the film.

17. In a machine of the class described, the combination of a pair of rotary spools adapted to support a film for unwinding and rewinding, a driving shaft for said spools, means for connecting said shaft alternately to one spool and the other during the unwinding and rewinding of the film, said means including an adjustable clutch member, sprocket means operated by said shaft and arranged to engage the film, an electric motor connected to said shaft, a second adjustable clutch member to reverse the rotation of said shaft, a third adjustable clutch member to operate said shaft at increased speed during the rewinding of the film, and electromagnetic means for simultaneously operating all three clutch members when the film has been unwound, whereby the film is automatically rewound at increased speed.

18. A motion picture machine comprising an outer casing, a pair of horizontal shafts projecting from said casing and adapted to support film reels, a third horizontal shaft projecting out of said casing and arranged between said reel shafts, sprocket means operated by said third shaft and arranged to engage the film, driving connections between said third shaft and said reel shafts, a vertical shaft mounted in said casing, an electric motor permanently geared to said vertical shaft in reduced transmission ratio, a fourth horizontal shaft in said casing, a reversible driving connection between said vertical shaft and said fourth shaft, said connection including an adjustable member, and electromagnetic means controlled by the film for operating said member to reverse the rotation of said fourth shaft when the film is unwound.

19. A motion picture machine comprising an outer casing, a pair of horizontal shafts projecting from said casing and adapted to support film reels, a third horizontal shaft projecting out of said casing and arranged between said reel shafts, sprocket means operated by said third shaft and arranged to engage the film, driving connections between said third shaft and said reel shafts, a vertical shaft mounted in said casing, an electric motor permanently geared to said vertical shaft in reduced transmission ratio, a fourth horizontal shaft in said casing, a reversible driving connection between said vertical shaft and said fourth shaft, said connection including an adjustable member, variable transmission connections between said fourth shaft and said third shaft for operating the latter at increased speed during the rewinding of the film, a second adjustable member for controlling said last-mentioned connections, and means for simultaneously operating both of said members to rewind the film at increased speed.

20. A motion picture machine comprising an outer casing, a pair of horizontal shafts projecting from said casing and adapted to support film reels, a third horizontal shaft projecting out of said casing and arranged between said reel shafts, sprocket means operated by said third shaft and arranged to engage the film, driving connections between said third shaft and said reel shafts, a vertical shaft mounted in said casing, an electric motor permanently geared to said vertical shaft in reduced transmission ratio, a gear fixed on the upper end of said vertical shaft, a fourth horizontal shaft in said casing, a pair of gears mounted loosely on said fourth shaft and in mesh with opposite sides of said first-mentioned gear, an adjustable clutch member keyed to said fourth shaft between said pair of gears for connecting either of them to said fourth shaft, whereby the latter is operated in one direction or the other, two gear connections between said fourth shaft and said third shaft for operating the latter at increased speed during the rewinding of the film, a second adjustable clutch member for rendering either one of said gear connections operative, and electromagnetic means for simultaneously operating both clutch members to rewind the film at increased speed.

21. Cinematographic apparatus for simultaneously winding a plurality of films, comprising a plurality of concentric shafts having reel-holding portions offset longitudinally of their common axis respectively to receive reels side by side, a plurality of reels detachably fitting over said portions for said films respectively, means for preventing relative rotation between each reel and the corresponding shaft, and means for driving the reels at different speeds depending upon the tension on the films respectively.

22. Cinematographic apparatus for simultaneously winding a plurality of films, comprising a plurality of concentric shafts having reel-holding portions offset longitudinally of their common axis respectively to receive reels side by side, a plurality of reels detachably fitting over said portions for said films respectively, and means for driving said reels at different speeds with sufficient force concomitantly to wind films thereupon respectively.

23. Film apparatus having a pair of reels for operatively supporting a length of film provided near each end with integral operating means arranged within the normal width and thickness of the film, driving mechanism for unwinding the film from the initial supply reel to the initial take-up reel, said mechanism including means for automatically reversing the film to wind it from the initial take-up reel back to the initial supply reel, and means for automatically stopping the film when rewound on the initial supply reel, said reversing means and stopping means being controlled by said operating means and being independent of the speed of the film, said stopping means remaining inoperative when the film is wound up on the initial take-up reel.

24. A film-operating machine having reels for operatively supporting a film, reversible driving mechanism for said reels, and means controlled by the film for automatically stopping the film when rewound, said film-stopping means operating independently of the speed of the film and remaining inoperative when the film is wound up on the initial take-up reel.

25. A film-operating machine having reels for operatively supporting a film, reversible driving mechanism for said reels, said mechanism including means for operating the reels at greater speed during the rewinding than during the unwinding of the film, and means for automatically stopping the film when rewound, said film-stopping means operating independently of the speed of the film and remaining inoperative when the film is wound up on the initial take-up reel.

ADOLPH A. THOMAS.